Dec. 15, 1931. E. KÄGI 1,836,757
POWER TRANSMISSION MECHANISM
Filed June 2, 1927   4 Sheets-Sheet 1

Dec. 15, 1931.  E. KÄGI  1,836,757
POWER TRANSMISSION MECHANISM
Filed June 2, 1927  4 Sheets-Sheet 2

INVENTOR
Emil Kägi

Dec. 15, 1931.  E. KÄGI  1,836,757
POWER TRANSMISSION MECHANISM
Filed June 2, 1927   4 Sheets-Sheet 4

INVENTOR
Emil Kägi
By
Attorneys

Patented Dec. 15, 1931

1,836,757

UNITED STATES PATENT OFFICE

EMIL KÄGI, OF WINTERTHUR, SWITZERLAND, ASSIGNOR TO THE FIRM SULZER FRERÈS SOCIÉTÉ ANONYME, OF WINTERTHUR, SWITZERLAND

POWER TRANSMISSION MECHANISM

Application filed June 2, 1927, Serial No. 195,908, and in Switzerland July 1, 1926.

This invention relates to power transmission mechanism of the kind comprising two relatively moving mechanical systems.

According to the present invention one system executes two different kinds of movement simultaneously in such a way that the inertia of this system acting upon those movements which are independent of such forces causes the transmission of power from one system to the other. Preferably the two different kinds of movement are imparted to the secondary system, in which case the secondary system executes a rotary motion relatively to the primary system, which follows a circular or an elliptical path such as that traced out by a rod connecting two rotating cranks or by the connecting rod of a reciprocating engine.

In order that power may usefully be transmitted by the mechanism, the primary system may form the working chamber of a fluid pressure engine and the secondary system may be connected to a displacement member disposed within the working chamber, means being provided for supplying working fluid to the chamber so that the apparatus may be used as a compressor or as a prime mover.

In order that the invention may be better understood reference is made to the accompanying drawings, wherein:—

Figure 1:
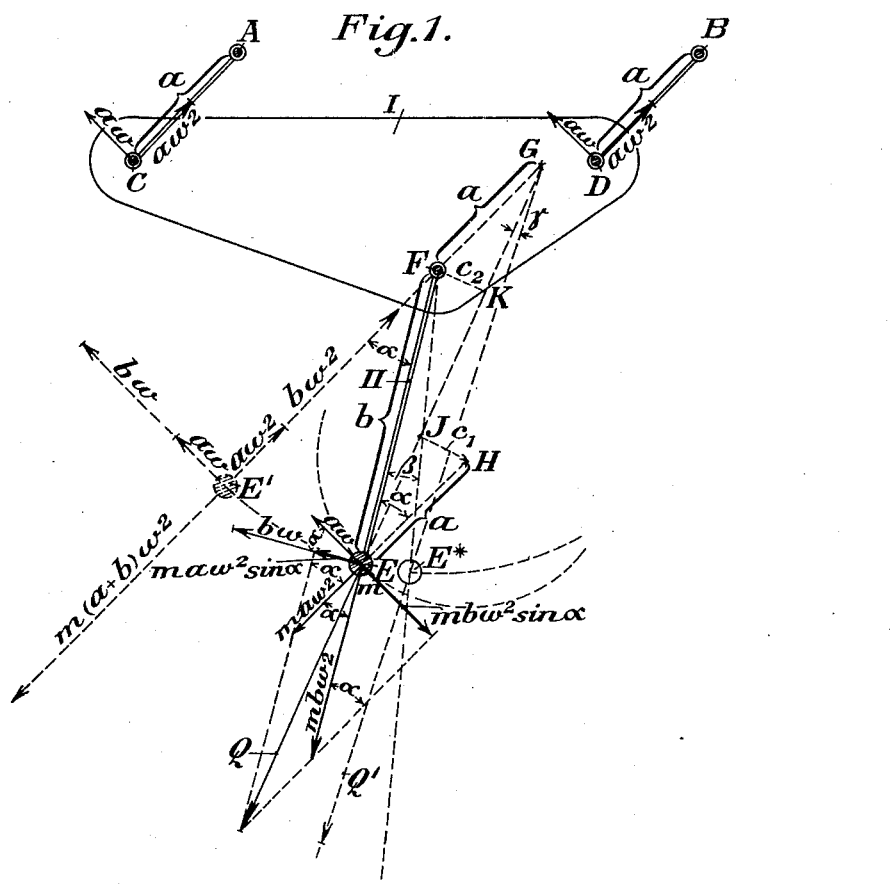
Figure 2:
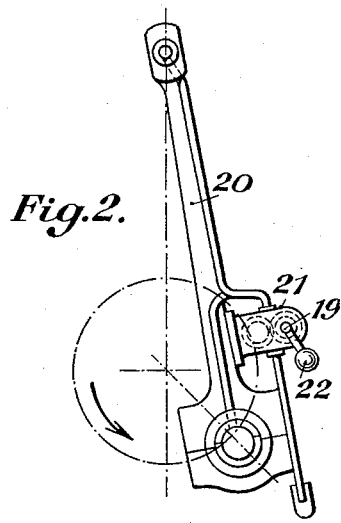
Figure 7:
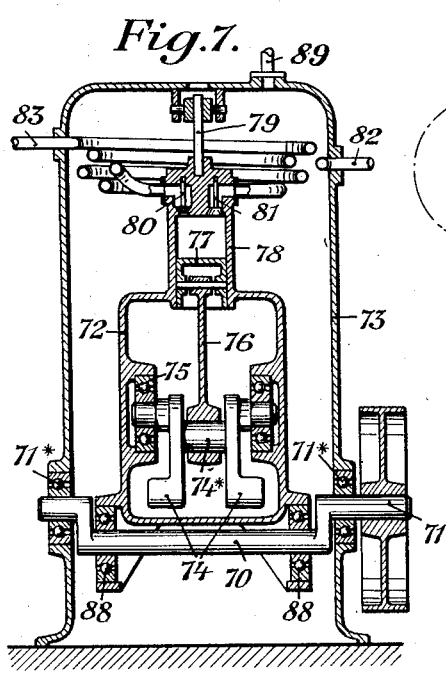
Figure 8:
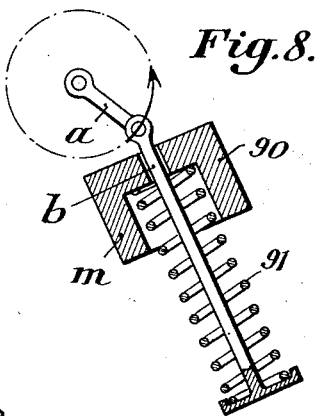
Figure 3:
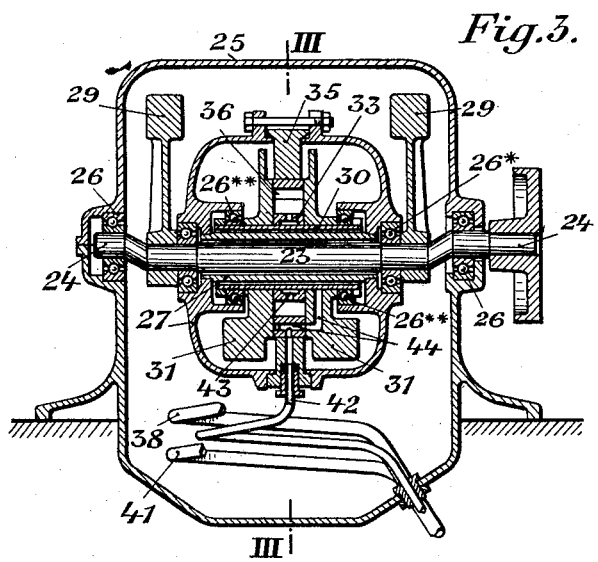
Figure 4:
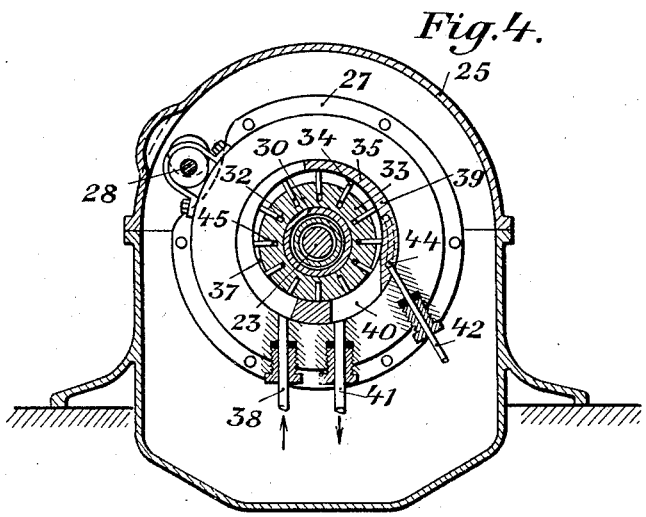
Figure 5:
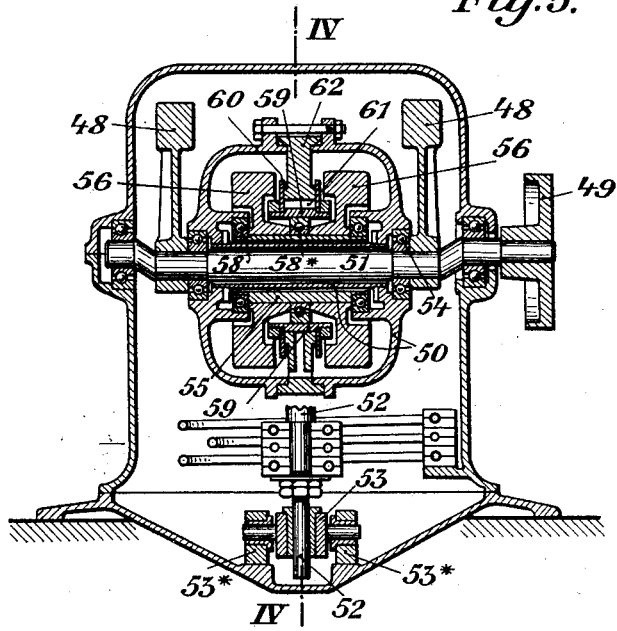
Figure 6:
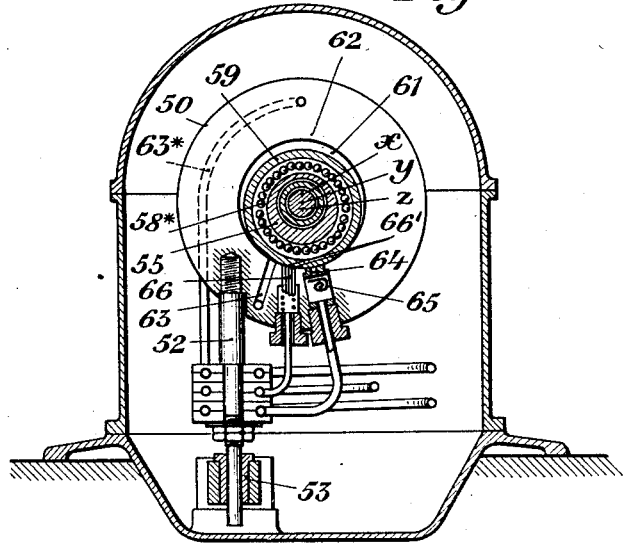

Fig. 1 is a diagram of the kinetic forces involved in a mechanism in accordance with the invention, Fig. 2 illustrates the application of the invention to the driving of a lubricating pump mounted on the connecting rod of a reciprocating engine, Fig. 3 is a sectional elevation of a rotary compressor, Fig. 4 is a cross section on the line III—III of Fig. 3, Fig. 5 is a cross sectional elevation of another form of compressor, Fig. 6 is a cross section on the line IV—IV of Fig. 5, Fig. 7 illustrates in cross sectional elevation a reciprocating compressor in which the rotary motion of the secondary system is used to drive the system, Fig. 8 shows diagrammatically an arrangement in which the radius of rotation of the center of gravity of the mass $m$ is variable.

In Fig. 1 the primary system is represented at I and is freely suspended at the ends C and D of two rods AC and BD pivoted at A and B respectively. When the rod AC, for example, is caused to rotate about its pivot A then the points C and D rotate about the points A and B. If now, AC=BD, AB=CD and AC is parallel to BD, the whole being in one plane, then all points in system I execute congruent translatory and circular movements. Let the radius of the rotary part of this motion be denoted by $a$ and the angular velocity be constant and denoted by $\omega$ then the velocity of all points on system I is equal to $a\omega$ and the acceleration is equal to $a\omega^2$. The secondary system is represented at II and has its centre of gravity lying in E. By means of the rod EF, the secondary system whose mass $m$ is considered concentrated at E, is freely suspended from the point F of the primary system. Thus the mass $m$ can execute a rotary motion relatively to the system I about the point F as center, the radius of this rotary motion being represented by $b$=EF. Neglecting the action of gravity, if this relative rotary motion is not absorbing any power, that is to say, if it is not being used to transmit power for the drive of a machine, EF will always remain parallel to AC and BD assuming that the movements are frictionless. Hence the arm FE will take up the position FE¹ indicated by dotted lines in the diagram and the rotation will also be performed with constant angular velocity $\omega$. The absolute velocity of the centre of gravity of mass $m$ in position E¹ will be equal to the sum of the primary and secondary velocities, i. e.

$$a\omega + b\omega = (a+b)\omega.$$

The acceleration will be the sum of the two accelerations $a\omega^2 + b\omega^2 = (a+b)\omega^2$ and the centre of gravity of mass $m$ will execute a rotary motion around the fixed point G with $a+b$ as its radius.

In the position of mass $m$ shown in the diagram neither the total centrifugal force $m(a+b)\omega^2$ nor either of its two components $ma\omega^2$ or $mb\omega^2$ can influence either of the two motions, i. e. it is not able to produce work by means of the relative rotary motion or to offer resistance to the primary translatory motion.

In order that the relative movements of rotation may be utilized to transmit work it is necessary that system II shall lag behind or lead in front of the position $FE^1$. In the diagram, Figure 1, system II is shown as lagging behind the position $FE^1$ by an angle $\alpha$. If the work to be transmitted remains constant then the angle $\alpha$ will also remain constant and the rotation will again be performed at a constant angular velocity $\omega$. The velocities of translation and rotation of the centre of gravity of mass $m$ do not, however, now act in the same direction but are displaced with relation to one another by the angle $\alpha$. The mass $m$ still rotates about the fixed point G but the radius of this rotation has decreased from $GE^1$ to GE. The centrifugal force tends to increase the radius GE to the greatest value $GE^1$ i. e. it tries to decrease the angle $\alpha$ and hence it can be made to do work in the direction of rotation.

In the special case under discussion the amount of work which can be transmitted can be calculated very simply.

As can be seen from Figure 1 it is evident that the secondary centrifugal force $mb\omega^2$ cannot directly affect the relative velocity of rotation but the primary centrifugal force $ma\omega^2$ has a component $ma\omega^2 \sin \alpha$ which acts in the direction of the relative rotation of the mass $m$. This primary centrifugal force is therefore able to do work relatively to the system I (the latter being assumed stationary) the quantity of this work per time unit being given by the product $ma\omega^2 \sin \alpha \omega b$. As the kinetic energy of the mass $m$ does not alter, this work must be supplied from external sources. Such work need not be directly applied to the mass $m$ but can be transmitted through the system I.

It has therefore to be shown that the total centrifugal force Q which acts as a driving force on the relative rotary movement acts with equal intensity as a braking force on the primary translatory movement. Evidently in the braking movement it is now the primary centrifugal force $ma\omega^2$ which cannot directly affect the translatory movement, whereas the secondary centrifugal force $mb\omega^2$ supplies a component $mb\omega^2 \sin \alpha$ in opposition to the primary movement of the mass $m$ or its point of suspension F.

Thus a resistance is offered to the movement of system I, the work done by this resistance per time unit being given by the product $mb\omega^2 \sin \alpha \omega a$. If this work is supplied to system I from external sources, e. g., through the driving rod AC, then system II, by reason of its movements relatively to system I is able to do exactly the same amount of work without being driven directly and without necessitating any change in the kinetic energy of any of the masses.

The general principles involved may be summarized more generally as follows.

System II, which is either inaccessible or unsuitable for direct drive, is not directly connected in any way with an external drive (e. g. by means of gearing, belt or crank). The force which must be exerted on the mass $m$ in order that it may execute its actual movements can therefore only be supplied through system I, for example partly through the rod EF and partly through a pump or like device of which the cylinder may form a part of system I and the piston a part of system II.

The forces transmitted through system I must therefore have a resultant which passes through the point E and is equal and opposite to the centrifugal force.

The conditions of equilibrium are unaffected if instead of a number of forces transmitted from various points of system I, a single force is exerted through the point E, i. e. if the total centrifugal force Q originating from point E of system II directly acts against a point E from system I which coincides with the point E of system II. If this primary point E executes a translatory movement with H as instantaneous centre of curvature, then this movement will be braked by a moment equal to the product of the total centrifugal force Q and the perpendicular $HJ = c_1$ running from H to the line of the centrifugal force.

In the direction of the relative rotation there is a driving moment equal to the product of the total centrifugal force Q and the perpendicular $FK = c_2$ running from the point F to the line of the centrifugal force Q. In the particular case illustrated in Figure 1, where no kinetic energy of the mass $m$ is used to produce work, $c_1 = c_2$ since the triangles GFK and EHJ are congruent.

If the angle of lag $\alpha$ remains constant the task of balancing the mass $m$ presents no difficulties. The centrifugal force remains constant in magnitude and passes always through the same fixed point G, with the same phase displacement in regard to the direction of the driving rods AC and BD of the primary system. The point C may lie between the points A and B or at may coincide with either of them. In such cases the centrifugal force of the mass $m$ can be completely balanced by means of masses, which may be mounted on the rods AC and BD or on one of them, at a suitatble angle of lag.

When the angle $\alpha$ varies, either because the quantity of work varies periodically throughout a revolution, as when reciprocating compressor, single acting plunger pump or a single-vaned rotary compressor has to be driven, or because external running conditions affect the amount of work to be transmitted, then the problem of balancing becomes more difficult.

If A is the work output or input per time unit when the angle $\alpha$ is constant then, as already deduced, $$A = mab\omega^3 \sin \alpha$$

In this expression there are five different elements which will be influenced by the design of the machine. Of these elements $\omega$ is in many cases more or less fixed, as for instance, in the case of machines driven by direct coupled electric motors.

In the choice of the other four factors $m$, $a$, $b$ and $\sin \alpha$ there is greater latitude allowed, and the following will show how these factors are chosen so as to obtain the most favorable conditions for balancing.

It is first assumed that the quantity of work does not alter during one revolution but that the amount of work transmitted may be greater or smaller according to the external working conditions. Thus the angle $\alpha$ although remaining constant throughout each revolution, may therefore have different values and it can be shown mathematically how such alterations in the value of $\alpha$ or rather a change in the rate of transmission of work will affect the problem of balancing.

If for a particular value of $\alpha$ the centrifugal force $Q$ is completely balanced by means of counter weights, and if the angle $\alpha$ is increased by an amount $\beta$, the line through which $Q$ acts will be turned through an angle $\gamma$ and the centrifugal force will be reduced to the value $Q^1$ (position E* in Figure 1). Then the unbalanced mass reaction will be given by $$Z = \sqrt{Q^2 + (Q^1)^2 - QQ^1 \cos \gamma}$$

If $\beta$ and therefore $\gamma$ also, is small, then $Z$ may be considered approximately equal to the difference between $Q$ and $Q^1$.

The expression for the centrifugal force $$Q = m\omega^2 \sqrt{a^2 + b^2 + 2ab \cos \alpha}$$

when differentiated with respect to $\alpha$ gives $$dQ = \frac{-mab\omega^2 \sin \alpha}{\sqrt{a^2 + b^2 + 2ab \cos \alpha}} d\alpha$$

The differentiation with respect to $\alpha$ of the equation for the work per unit time gives $$dA = mab\omega^3 \cos \alpha \, d\alpha$$

so that $$dQ = \frac{-\tan \alpha}{\omega \sqrt{a^2 + b^2 + 2ab \cos \alpha}} dA$$

The denominator in the right hand side of the equation is the instantaneous velocity of the mass $m$, so that $$\frac{dA}{\omega \sqrt{a^2 + b^2 + 2ab \cos \alpha}}$$

represents the change in the driving force with relation to the velocity of the mass.

If $\alpha$ is less than 45 degrees, i. e. if $\tan \alpha$ is less than 1 the variations in the centrifugal force are less than the variations in this driving force. If $\alpha$ is greater than 45 degrees they are, on the contrary greater.

The value 45 degrees for $\alpha$ is in a measure a critical or limiting value, a fact which becomes still clearer when the expression for the work transmitted, in which the sine appears, is examined. It is of little use to increase the value of $\alpha$ beyond 45 degrees in order to give $\sin \alpha$ a large value so that the product $mab\omega^3$ can be correspondingly smaller, because while the value of the sine for angles between 0 degrees and 45 degrees varies from 0 to about 0.7, its value for angles between 45 degrees and 90 degrees only varies between 0.7 and 1.0. Further an increase in the value of $\alpha$ beyond 45 degrees has a particularly harmful effect on the value of $dQ$ because for angles between 0 degrees and 45 degrees the tangent varies from 0 to 1 while for angles between 45 degrees and 90 degrees it varies from 1 to $\infty$.

The large values which $\tan \alpha$ has within a certain range, show that increases in the value of the angle $\alpha$ above a certain value, affect the amount of work transmitted less and less as $\alpha$ increases, just because the changes in the centrifugal force cannot be eliminated.

One of the important features of the invention is therefore expressed in the following equation from which the most favorable values of $m$, $a$, $b$ and $\alpha$ can be determined, $$mab\omega^3 \geq A\sqrt{2}$$

where A is the work transmitted. Thus the maximum value of $\sin \alpha$ will be $$\tfrac{1}{2}\sqrt{2}$$

and the angle $\alpha$ will lie between 0 degree and 45 degrees in which case the machine will readily and exactly respond to changes in the amount of work to be transmitted without necessitating any large changes in the centrifugal force.

In addition to the angle $\alpha$ the velocity of the mass $m$, the value of which is given by the expression $$\omega \sqrt{a^2 + b^2 + 2ab \cos \alpha}$$

plays an important part in the balancing.

This velocity which appears to the power of $-1$ in the expression for $dQ$ appears to the power of $+1$ in the expression for centrifugal force, where it is moreover multiplied by $\omega$.

An increase in the factors $a$, $b$ and $\omega$ in order to maintain $\sin \alpha$ small, which results in a corresponding increase in velocity $$\omega \sqrt{a^2 + b^2 + 2ab \cos \alpha}$$

also causes the alterations in the centrifugal force to decrease in proportion to the increase in velocity, in spite of the fact that the centrifugal force itself increases more rapidly than this velocity.

In machines provided with a power transmission according to the invention it is therefore desirable to make the factors $a$, $b$ and $\omega$, and not the mass $m$ as great as considerations of design will allow.

In the foregoing discussion the kinetic energy of the mass $m$ plays no part at all, and this power transmission is best suited to cases in which the driving torque remains constant throughout any one revolution.

If however the quantity of work is subjected to fluctuations recurring periodically at each revolution, then the kinetic energy of the mass $m$ comes into consideration and the working becomes considerably more complicated.

An examination of the operations taking place in such cases shows that the conditions for balancing are more favorable the smaller the value of the expression $$\frac{a}{b}\sin \alpha.$$

Hence for such machines not only $\sin \alpha$ but also $$\frac{a}{b}$$

is preferably to be kept small, i. e. $b$ to be made as large as possible with relation to $a$. Further since in machines in which the quantity of work remains practically constant, small fluctuations do occur, it is important in these machines also to give $$\frac{a}{b}$$

a small value.

If however $b$ is considerably greater than $a$ then the starting of the machine is more difficult. Hence a second feature of the invention consists in that the mass $m$ of system II is so arranged that the radius of rotation of its centre of gravity is variable.

It will be appreciated that although the apparatus has been described in its application to a machine for absorbing work it can also be applied to a prime mover, in which case the angle $\alpha$ is a leading angle.

In the construction illustrated in Figure 2 the casing 21 of the oil pump forms system I and is mounted on the connecting rod 20 of a reciprocating engine. It therefore executes an elliptical practically translatory motion. The secondary system is constituted by a weight 22 mounted to rotate about the point 19. The movement of the connecting rod 20 and the casing 21 causes the weight 22 to rotate and so drive the pump.

In the construction illustrated in Figures 3 and 4 the invention is applied to a rotary compressor of the kind used for example with refrigerating machines. In this construction the compressor casing 27 is rotatably mounted on the crank pin 23 of a shaft 24 adapted to rotate in ball bearings 26 carried in an exterior housing 25. The outer circumference of the casing 27 is connected at one point to a second crank 28 also mounted to rotate in the housing 25 and having the same degree of eccentricity as the crank 23. Thus it will be seen that the movement of the casing 27, supported as it is on the cranks 23 and 28 is similar to that of the coupling rod of a locomotive. The casing 27 runs in ball bearings 26* and counter weights 29 are provided to balance the centrifugal forces of the moving parts.

In the interior of the casing 27 is disposed a hollow sleeve 30 mounted in ball bearings 26** and on this sleeve or shaft are secured two eccentric weights 31 which under the influence of the centrifugal force set up by the translatory motion of the casing 27 impart a rotary motion to the sleeve 30. It will be understood that the casing 27 corresponds to system I and the weights 31 to system II. The sleeve 30 also carries a rotary displacement member 33 provided with vanes 34 adapted to slide in slots 32, these vanes being pressed by the centrifugal force against a casing 35 disposed eccentrically within the casing 27. As the member 33 rotates the medium to be compressed is drawn in through the pipe 38 and passes out through the discharge port 40 into the delivery pipe 41.

For purposes of lubrication a pipe 42 is provided, through which oil is fed into a channel 44 extending for about one quarter of the circumference of the casing. From this channel the oil passes into a lubricating space 43 as shown in Figure 3. It will be seen that each of the slots 45 for the reception of the vanes 34 is permanently in communication with the lubricating system, the sealing of the sliding surfaces as well as their lubrication being effected by the oil. In addition the pressure within the spaces 45 is maintained substantially constant although the volume of each space is constantly varying.

The various pipes which are connected to the moving casing 27 are each provided with a helically coiled portion which renders them flexible and permits them to follow the movement of the casing without fracture occurring.

In the further construction according to the invention shown in Figures 5 and 6, the compressor comprises a completely sealed and enclosed casing 50 rotatably mounted in ball bearings 54 on a crank 51 driven by means of a coupling 49. In order to prevent the casing 50 rotating about its own axis it is provided with a downwardly projecting rod 52, the lower end of which is adapted to slide in an oscillating bearing 53. Inside the casing 50 a hollow sleeve 55 is mounted in ball bearings 58 so as to rotate eccentrically on the crank 51 (Figure 6) and this sleeve carries two weights 56 having their centre of gravity $a$ (Figure 6) eccentric to the centre line of the bearings 58. It will be understood that the two weights 56 form system II while the casing 50 forms system I.

The weights 56 form the sides of a working chamber which is bounded circumferentially by a rib 62 projecting from the interior of the casing 50, and within this working chamber is disposed a displacement member 59 provided with packing discs 60. This displacement member is mounted in ball bearings 58* on the eccentric sleeve 55 so that as the crank 51 rotates the weights 56 cause the sleeve to rotate also and the member 59 is thus carried round eccentrically inside the working chamber leaving a crescent shaped working space 61 within which the working fluid is compressed.

The working fluid is drawn through a pipe 63* and enters the compressor at 63 leaving it again through a discharge valve 65 whence it passes out through a hole 64. Between the suction side and the pressure side, packing 66 is provided, the individual packing strips 66' being pressed against the rotary displacement member 59 both by spring and gas pressure.

In Figure 7 the invention is illustrated in its application to a reciprocating compressor consisting of a main housing 73 within which a crank shaft 71 is mounted to rotate in ball bearings 71*. On the crank 70 is mounted a casing 72 which is carried on ball bearings 88 so as to be rotatable relatively to the crank. In order, however, that the casing 72 shall not rotate together with the crank, its upper end is provided with a slidably mounted projecting rod 79. Thus the movement executed by the casing 72 is similar to that performed by the connecting rod of a reciprocating engine.

Within the casing 72 and in ball bearings 75 is mounted a second crank 74* the shaft of which carries eccentrically mounted weights 74 (forming system II). The upper end of the casing 72 is constructed in the form of a cylinder 78 within which is adapted to reciprocate a piston 77 connected to the crank pin 74* by means of a rod 76.

As the casing 72 (which forms system I) executes its translatory motion the weights 74 cause the crank 74* to rotate and drive the piston 77, drawing in working fluid through the pipe 82 and valve 81 and forcing it out through valve 80 and the pipe 83.

In the constructions illustrated in Figures 3 to 7 the pipes conveying working fluid and partly also those conveying oil to and from the machine are made flexible so as to allow for the movements of the casing and in practice the occurrence of a fracture in any of these pipes is very rare. Nevertheless in order to provide a means of escape for the gases liberated if such a fracture should occur, a vent pipe, such, for example, as 89 in Figure 7 may be provided on the external housing of the machine. This vent pipe may communicate with the atmosphere or with the cooling water outlet pipe or any place where the escape of the working fluid would not be detrimental.

In Figure 8 a construction is shown in which the radius of rotation of the masses in system II is variable. The value of $$\frac{a}{b}$$

which is most suitable for starting the machine may not always be suitable when the machine is actually running. Hence in the construction of Figure 8 the rotating weight 90 is normally maintained in a position near its centre of rotation by means of a spring 91 so that when the machine is being started up the radius $b$ is small but increases as the machine gathers speed.

It will be appreciated that the invention provides a machine which does not depend for its motion upon the kinetic energy of the moving masses but solely upon the centrifugal forces set up by the movements which take place.

I claim:

1. A power transmission mechanism comprising two relatively movable parts, means for imparting a cyclic movement to one of said parts, the other of said parts being connected to said first named part and movable therewith, and means actuated by the centrifugal force resulting from the cyclic movement of said first named part for imparting a second cyclic movement to the other of said parts.

2. A power transmission mechanism comprising two relatively movable parts, means for imparting a cyclic movement to one of said parts, the other of said parts being physically connected to said first named part and movable therewith, and means actuated by the centrifugal force resulting from the cyclic movement of said first named part for imparting a second cyclic movement simultaneous with said first cyclic movement to the other of said parts.

3. A power transmission mechanism comprising a primary part and a secondary part physically connected together and capable of movement relative to each other, means for imparting a constrained cyclic translatory movement to said primary part, and means actuated by the centrifugal force resulting from the cyclic movement of said primary part for imparting to said secondary part a rotational movement about a point on said primary part.

4. A power transmission mechanism as set forth in claim 3, including means for varying the radius of rotation of the center of gravity of the secondary part.

5. A power transmission mechanism as set forth in claim 3, including spring means for varying the radius of rotation of the center of gravity of the secondary part.

6. A power transmission mechanism as set forth in claim 3, including means for imparting to the primary part a cyclic movement having a radius less than the distance between the center of gravity and the center of rotation of the secondary part.

7. A power transmission mechanism as set forth in claim 3, including a primary part and a secondary part angularly displaced to an extent less than about 45°.

8. A power transmission mechanism as set forth in claim 3, including means for converting the cyclic movement of the secondary part into reciprocatory movement.

9. A power transmission mechanism as set forth in claim 3, characterized by the provision of a primary part including the working chamber of a fluid pressure engine, a secondary part including a displacement member disposed in said working chamber, and means for supplying working fluid to said chamber.

10. A power transmission mechanism as set forth in claim 3, characterized by the provision of a primary part including a crank and a working chamber of a fluid pressure engine, said chamber being mounted on said crank and adapted to rotate as a whole therewith, and a secondary part including a displacement member disposed in said chamber rotatably mounted eccentrically with respect to said working chamber.

11. A power transmission mechanism as set forth in claim 3, characterized by the provision of a primary part including an axially mounted working chamber of a fluid pressure engine, means for preventing axial rotation of said chamber, a secondary part including a displacement member disposed in said chamber, and means for supplying working fluid to said chamber.

12. A power transmission mechanism as set forth in claim 3, characterized by the provision of a primary part including a crank and a working chamber of a fluid pressure engine, said chamber being mounted on said crank and adapted to rotate as a whole therewith, means for preventing rotation of said chamber, about said crank, and a secondary part including a displacement member disposed in said chamber rotatably mounted eccentrically with respect to said working chamber.

13. A power transmission mechanism as set forth in claim 3, characterized by the provision of a primary part including a crank and a working chamber of a fluid pressure engine, said chamber being mounted on said crank and adapted to rotate as a whole therewith, a secondary part including a displacement member disposed in said chamber rotatably mounted eccentrically with respect to said working chamber, and counterweights eccentrically mounted with respect to said crank and adapted to balance the centrifugal force resulting from the movement of said displacement member.

14. A power transmission mechanism comprising two relatively movable parts, means for imparting a cyclic movement to one of said parts, means actuated by the centrifugal force resulting from the cyclic movement of said part for actuating the other of said parts and transmitting power thereto, and means for balancing said parts when the load is of constant value.

In testimony whereof I have affixed my signature.

EMIL KÄGI.